United States Patent
Bakhtiari et al.

(10) Patent No.: US 9,418,432 B2
(45) Date of Patent: Aug. 16, 2016

(54) IMAGING SYSTEM WITH DEPTH ESTIMATION MECHANISM AND METHOD OF OPERATION THEREOF

(71) Applicant: Sony Corporation, Tokyo (JP)

(72) Inventors: Somayeh Bakhtiari, San Jose, CA (US); Pingshan Li, Sunnyvale, CA (US); Alexander Berestov, San Jose, CA (US)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 14/229,695

(22) Filed: Mar. 28, 2014

(65) Prior Publication Data

US 2015/0279043 A1    Oct. 1, 2015

(51) Int. Cl.
    *G06K 9/40*    (2006.01)
    *G06T 7/00*    (2006.01)
    *G06K 9/46*    (2006.01)
    *G01B 11/22*   (2006.01)

(52) U.S. Cl.
    CPC .............. *G06T 7/0065* (2013.01); *G01B 11/22* (2013.01); *G06K 9/4642* (2013.01); *G06T 7/004* (2013.01); *G06T 7/0022* (2013.01); *G06T 7/0051* (2013.01); *G06T 7/0069* (2013.01)

(58) Field of Classification Search
    USPC ......... 382/100, 154, 168, 170, 224, 228, 255, 382/278, 282, 325
    See application file for complete search history.

(56) References Cited

U.S. PATENT DOCUMENTS

| | | | |
|---|---|---|---|
| 7,929,801 B2* | 4/2011 | Nakamura | G06T 7/0069 382/264 |
| 8,027,582 B2 | 9/2011 | Li | |
| 8,194,995 B2* | 6/2012 | Wong | H04N 5/23212 382/255 |
| 8,233,077 B2 | 7/2012 | Safaee-Rad et al. | |
| 8,280,194 B2 | 10/2012 | Wong et al. | |
| 8,644,697 B1* | 2/2014 | Tzur | G06T 7/0059 348/345 |
| 8,988,592 B2* | 3/2015 | Takahashi | H04N 5/23212 382/255 |
| 9,087,405 B2* | 7/2015 | Seitz | G06T 7/0069 |

(Continued)

FOREIGN PATENT DOCUMENTS

EP      2538242 A1    12/2012

OTHER PUBLICATIONS

Namboodiri, "Novel Diffusion Based Techniques for Depth Estimation and Image Restoration From Defocused Images", "Department of Electrical Engineering", 2008, p. 135 pgs, Indian Institute of Technology—Bombay.

*Primary Examiner* — Eric Rush
(74) *Attorney, Agent, or Firm* — Haverstock & Owens LLP

(57) ABSTRACT

A system and method of operation of an imaging system includes: a capture module for receiving an input sequence with an image pair, the image pair having a first image and a second image and for determining a first patch from the first image and a second patch from the second image; an iteration module for generating an iteration map from the first patch of the first image and the second patch of the second image; and a position module for generating a final depth map from the iteration map and for determining a focus position from the final depth map.

16 Claims, 13 Drawing Sheets

(56) References Cited

U.S. PATENT DOCUMENTS

| | | | |
|---|---|---|---|
| 2010/0194971 A1* | 8/2010 | Li | G06T 7/0069 382/255 |
| 2011/0142287 A1* | 6/2011 | Wong | G06T 7/0049 382/106 |
| 2011/0181770 A1* | 7/2011 | Rapaport | H04N 5/2356 348/348 |
| 2011/0249173 A1* | 10/2011 | Li | H04N 5/23212 348/349 |
| 2012/0242796 A1 | 9/2012 | Ciurea et al. | |
| 2013/0044254 A1* | 2/2013 | Tzur | G06T 7/0069 382/255 |
| 2013/0063566 A1* | 3/2013 | Morgan-Mar | G06T 7/0069 348/46 |
| 2013/0142415 A1 | 6/2013 | Ali et al. | |
| 2015/0146994 A1* | 5/2015 | Arnison | G06T 7/0069 382/254 |

* cited by examiner

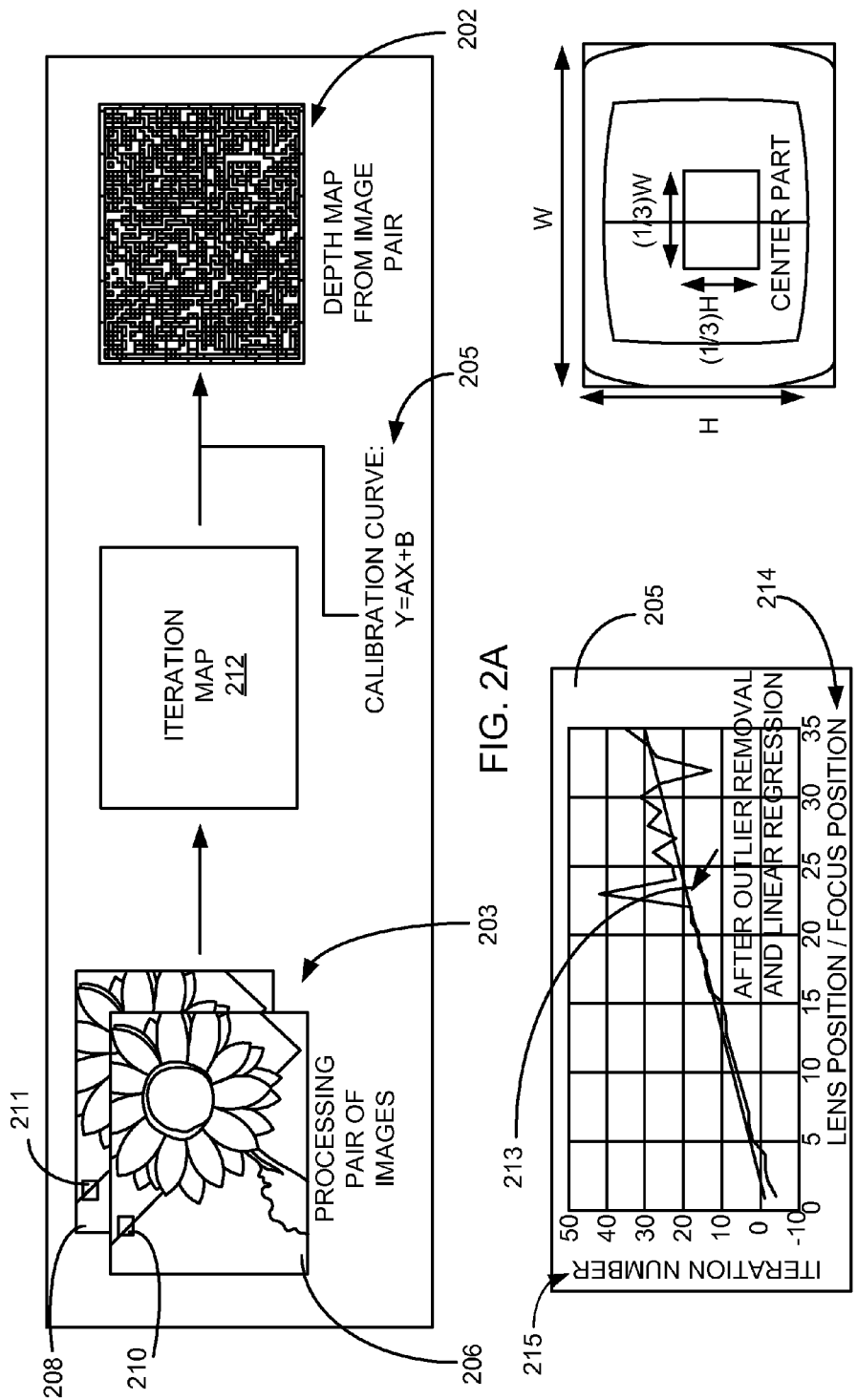

IMAGING SYSTEM WITH DEPTH ESTIMATION MECHANISM AND METHOD OF OPERATION THEREOF

TECHNICAL FIELD

The present invention relates generally to an imaging system, and more particularly to an imaging system for depth estimation.

BACKGROUND ART

Modern consumer and industrial electronics, especially devices with a graphical imaging capability, such as cameras, televisions, projectors, cellular phones, and combination devices, are providing increasing levels of functionality to support modern life including imaging, camera, and three-dimensional display devices. Research and development in the existing technologies can take a myriad of different directions.

As users become more empowered with the growth of imaging technology, new and old paradigms begin to take advantage of this new device space. There are many technological solutions to take advantage of this new display device opportunity.

Currently, depth estimation in images is possible but involves a lot of manual input from users and consumers. The current methods employed also lack certainty as real lens positions and focus points cannot be accurately detected. In automated methods, computational strain on computer systems is also a problem.

Thus, a need still remains for better imaging systems for depth estimation in images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides method of operation of an imaging system, including: receiving an input sequence with an image pair, the image pair having a first image and a second image; determining a first patch from the first image and a second patch from the second image; generating an iteration map from the first patch of the first image and the second patch of the second image; generating a final depth map from the iteration map; and determining a focus position from the final depth map.

The present invention provides an imaging system, including: a capture module for receiving an input sequence with an image pair, the image pair having a first image and a second image and for determining a first patch from the first image and a second patch from the second image; an iteration module for generating an iteration map from the first patch of the first image and the second patch of the second image; and a position module for generating a final depth map from the iteration map and for determining a focus position from the final depth map.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIGS. 2A-2D are process examples of generating a simple depth map in an iteration image process.

BEST MODE FOR CARRYING OUT THE INVENTION

Figure 1:
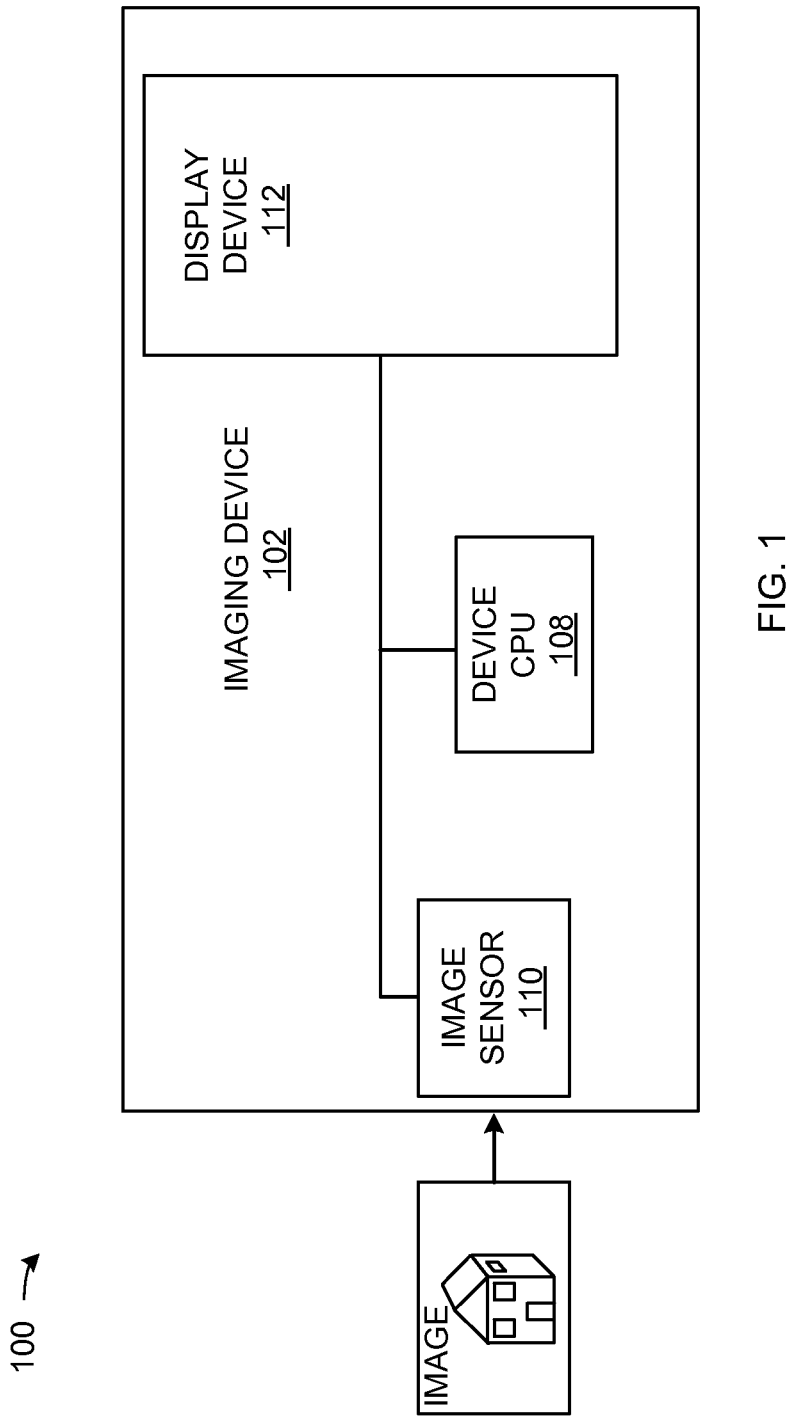
FIG. 1 is a hardware block diagram example of an imaging system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The same numbers are used in all the drawing FIGS. to relate to the same elements. The embodiments have been numbered first embodiment, second embodiment, etc. as a matter of descriptive convenience and are not intended to have any other significance or provide limitations for the present invention.

The term "image" is defined as a pictorial representation of an object. An image can include a two-dimensional image, three-dimensional image, video frame, a calculate file representation, an image from a camera, a video frame, or a combination thereof. For example, the image can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, calculator, integrated circuit, integrated circuit cores, or a combination thereof.

Depth from Defocus (DFD) is a powerful passive method which relies on only a single camera. It involves capturing and processing two or more images with different focal parameters. In recent years, DFD has gained popularity among Computer Vision researchers and it has been incorporated in many algorithms for depth map estimation or other applications. However, the resulting depth maps that are generated would be very noisy and unreliable if only two or a small number of images are used.

To handle this issue, a longer sequence of images is captured in a particular range of lens positions. Each image in the sequence can be divided into blocks or patches. For each patch, a number of iterations is calculated to track the number required to convolve a kernel with the sharper patch in one of the images to reach the same blur in the corresponding patch in other image.

In one embodiment of the present invention, iteration maps and depth maps based on maximum variance can be generated from the inputted image sequence. A depth map is defined as an image or image channel that contains information relating to the distance of the surfaces of scene objects from a viewpoint. The iteration map and the depth map based on maximum variance can be combined to generate a highly accurate final depth map. It has been found that the intuition behind this is that the larger number of images will provide more information about the depth value for each block of the scene.

However, this method will particularly affect the quality of the output when the image contains objects in various distances from camera. Yet, there is a major challenge with using a long sequence, namely, the high computational load. However, to calculate a depth map using a large range of images, it has been discovered that only a smaller subset of images need to be selected at different lens positions in the range.

In other words, it has been found that it is possible to sample the positions which have more contribution in constructing the depth map. Taking advantage of this idea, it is possible to reduce the number of required images from 95 to 8-20 images, for example. It has been found that the number of images depends on the depth variations in the scene.

For example, for a flat scene, only 8 images are needed, while for another scene with a very large depth range, only 18 images are needed. An algorithm that is iterative and starts with the image with the foreground object in focus can be used. Initially, a depth map using this image and the image at the next neighboring lens position is generated.

In another embodiment of the present invention, an improved method of generating depth maps using sampled de-focused images is shown. The method starts with an image with a foreground object in focus. Initially a depth map is generated using the image and another image at the neighboring lens position of the image. Further, a histogram of the resulted depth map is calculated. A plurality of dominant depths is calculated from the histogram.

Further, a plurality of lens positions associated with the plurality of dominant depths is extracted. Now, for each lens position of the plurality of lens positions, a corresponding depth map is generated. Finally, all the corresponding depth maps are combined to form a single new depth map. The single new depth map is generated using a maximum variance and an iteration number. Here, the number of images required for each iteration is estimated based on the width of the histogram.

In further detail, according to the histogram of the resulting initial depth maps, "K" lens position can be extracted. Then, K depth maps can be generated using the pair of images at derived positions, which will be combined into a new single depth map using two measures, the maximum variance and the iteration number.

Five more iterations of the described process can be run, where the maximum variance is applied in the first 3 iterations and the iteration number is used for the last 2 iterations. The new method is evaluated both subjectively and objectively by 10 test sequences with flat region at the center. It has been found that the depth map results of the above described approach produce highly accurate depth maps using less computational time because of the selective sampling.

For objective evaluation, it has been discovered that using a selective sampling method with iterations produces an error between the ground truth and the estimated depths at the center part is calculated, which is less than 0.5 Depth of Field (DOF) for all test cases. The ground truth is decided visually by comparing sharpness of the images in the long sequence (95 images with 1 DOF interval).

Referring now to FIG. 1, therein is shown a hardware block diagram example of an imaging system 100 in an embodiment of the present invention. An imaging device 102 is shown, which can receive images with an imaging sensor 110.

The imaging sensor 110 can receive a plurality of images at different focal lengths. The imaging sensor 110 can include the capability of changing DOF for each image received. For example the DOF can be on a scale from zero to hundred.

The imaging device 102 can include a device control unit 108, which is a central processing unit (CPU). The device control unit 108 can operate the components and modules of the imaging system 100.

For example, the device control unit 108 can process images and generate information maps based on the capture images. The imaging device 102 can include a display device 112 for displaying images and data relating to the capture images.

To take a sequence of usable images, the imaging sensor 110 is controlled by computer using a software which changes the lens position, automatically, within a user specified range, or a combination thereof. For example, a user can specify the starting and ending focusing position, and the DOF.

Referring now to FIGS. 2A-2D, therein are shown process examples of generating a simple depth map 202 in an iteration image process. The simple depth map 202 is a depth map generated from a pair of images.

Depth maps contain information relating to the distance of the surfaces of scene objects from a viewpoint. The imaging system 100 of FIG. 1 can generate multiple depth maps using different image processing methods. The multiple depth maps can be combined to generate a more accurate depth map based on a plurality of the simple depth map 202.

FIG. 2A shows a simplified process flow for generating the simple depth map 202. FIG. 2B shows a calibration curve 205, which shows a linear line obtained after outlier removal. The x-axis of chart of FIG. 2B is set over the lens position of the imaging sensor 110 of FIG. 1 and the y-axis is set over iteration numbers. FIG. 2C shows a step edge used for the calibrating sequence.

In the simplified process flow of FIG. 2A, an image pair 203 or pair of images are captured and processed. The image pair 203 includes a first image 206 and a second image 208. The first image 206 and the second image 208 are dividing into small blocks or patches. For example, a patch 210 is a sub-section of the image. The patch 210 can include pixel dimensions, such as a (N×N) pixels. For example, the patch 210 for the first image 206 can be a sixteen by sixteen pixel patch or thirty-two by thirty-two pixel patch.

After processing the pair of images, an iteration map 212 is formed. The iteration map 212 represents iteration numbers for all patches in the image. For example, two images can be used to build the iteration map 212. First, as described above, the images are split or divided into N×N pixel patches. Then, for each of the patch 210, the process includes convolving the sharper image with a kernel to reach the same blur as the corresponding patch in the second image 208.

The number of times the kernel is convolved is known as an iteration number 215. As a result, for each of the patch 210 in the image, one of the iteration number 215 is calculated. For example, if the image includes 20×30 total patches, the iteration map 212 includes a 20×30 iteration map (a two dimensional map). A plurality of generated iteration maps will be combined later to extract a final depth map based on iteration numbers.

Concisely, the process includes that for each of the patch 210, the process calculates the number of iterations required to convolve a kernel (Gaussian, here) with the sharper patch in one of the images to reach the same blur in the corresponding patch in the other image. The iteration map 212 can display a signal that represents the calculated iteration numbers at each lens position for the specific patch.

Further for example, if the first patch 210 in the first image 206 is sharper than a second patch 211 in the second image 208, the sign of the iteration number 215 would be positive (e.g. +5); otherwise, it will be negative (e.g. −5). Information from the iteration map 212, includes iteration numbers mapped to different lens positions.

FIGS. 2B and 2C show using the calibration curve 205 to estimate a focus position 214 from the first image 206 and the second image 208. The focus position 214 is defined as the lens position or depth of field for an object or kernel in an image. The focus position 214 also represents a zero crossing 213 point on the graph. The calibration curve 205 can be represented by the formula "y=Ax+b".

Given the iteration numbers and the slope of the calibration curve 205 (A), the focus position 214 or zero crossing 213 point can be estimated for any image pairs from other scenes. To plot the calibration curve 205, a sequence of step edge images are captured as seen in FIG. 2C.

To plot the calibration curve 205, the iteration number 215 is calculated for only the central block of the step edge image, as shown in FIG. 2C. Each pair of images in the sequence can be used to generate a single iteration number. For example, corresponding patches in the first image 206 and the second image 208 can generate a first iteration number.

Similarly, a second set of images can be used to generate a second iteration number and so forth. Thus, at the end of a sequence of images, a one-dimension vector (signal) can be generated based on the iteration numbers. The calibration curve 205 can include the vector or signal. It has been discovered that the calibration curve 205 can be generated without the need of the iteration map 212 because the calibration curve 205 can be calculated through using only the calculation of the iteration number 215 for a single block at the center as shown in FIG. 2C.

Finally, outliers are removed from the calibration curve 205 and a linear regression is applied for identifying the zero crossing (213) point. The zero crossing (213) point of the calibration curve 205 is the indicator for the focus position 214.

However, only using the first image 206 and the second image 208 does not provide depth maps with sufficient information or detail. The resulting depth map from only an image pair can be very noisy. Thus, the number of images used should be large enough to provide sufficient information for depth map estimation. As such, it has been found that the use of a large sequence of images, such as ninety-five images with different blurs, can be used to provide more accurate depth maps instead of using only two images.

Further, the main issue with using a large image sequence (i.e. 95 images) is that image capturing and depth map generation process would be very tedious and resource restrictive. It has been discovered that by using only sample images from the sequence (a sub-sequence) rather than using the whole sequence solves this computational problem.

For example, the number of captured images should depend on the depth variation in the scene or image. Six different images of different blurs can be used for a very flat scene, while forty images can be used for a scene with a wide range of depths. The subsequent methods described below, provide an adaptive process for accurate depth map generation.

Figure 2D:
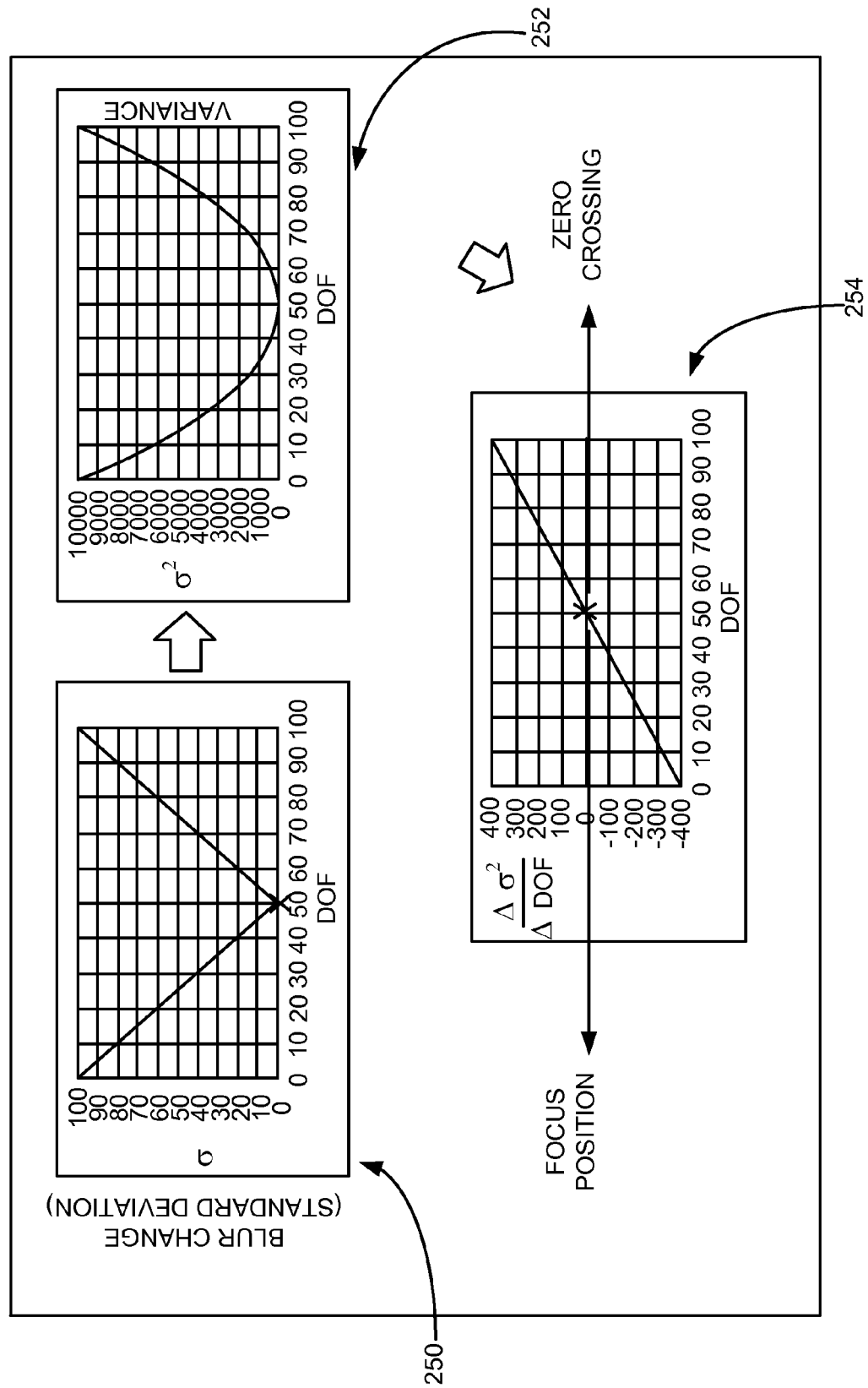

FIG. 2D shows graphical representations of determining the focus position 214 through the finding of the zero crossing (213) point of FIG. 2B. A first chart 250 shows that the blur change ($\sigma$) in one-dimensional signals changes linearly. However, since the images in the sequence are two-dimensional arrays, a two-dimensional form of standard deviation, such as variance, is needed.

A second chart 252 shows a curve based on variance ($\sigma^2$). Thus, it has been found that to account for two-dimensional arrays in a DFD approach, the difference between the blur amount of two images rather than the blur amount itself, is determined. Thus, it has been discovered that by taking the derivative of the variance, the blur difference can be calculated as shown in a third chart 254. The curve shown in the third chart 254 will be linear and have zero crossing (213) point that indicates the depth of field of the kernel.

Figure 3A:
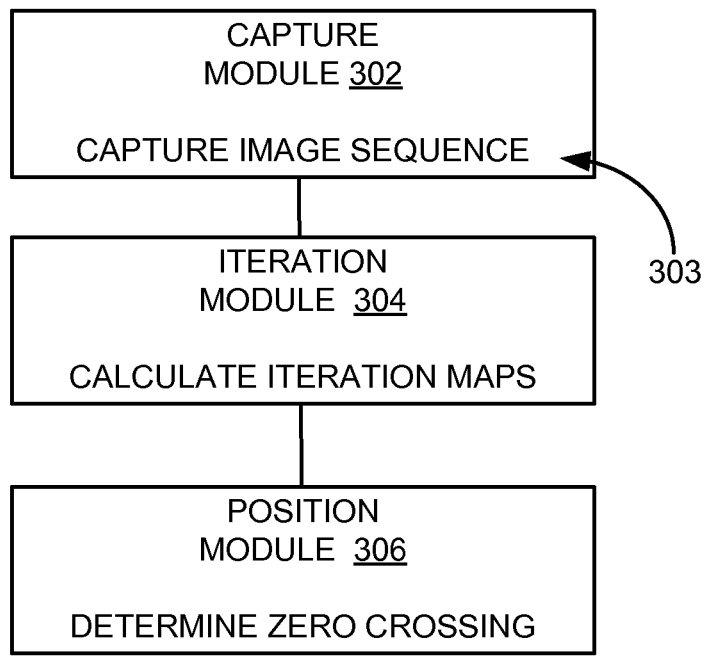
FIGS. 3A-3C are examples of a process flow of generating a depth map using iteration numbers in a sequence.
Figure 3B:
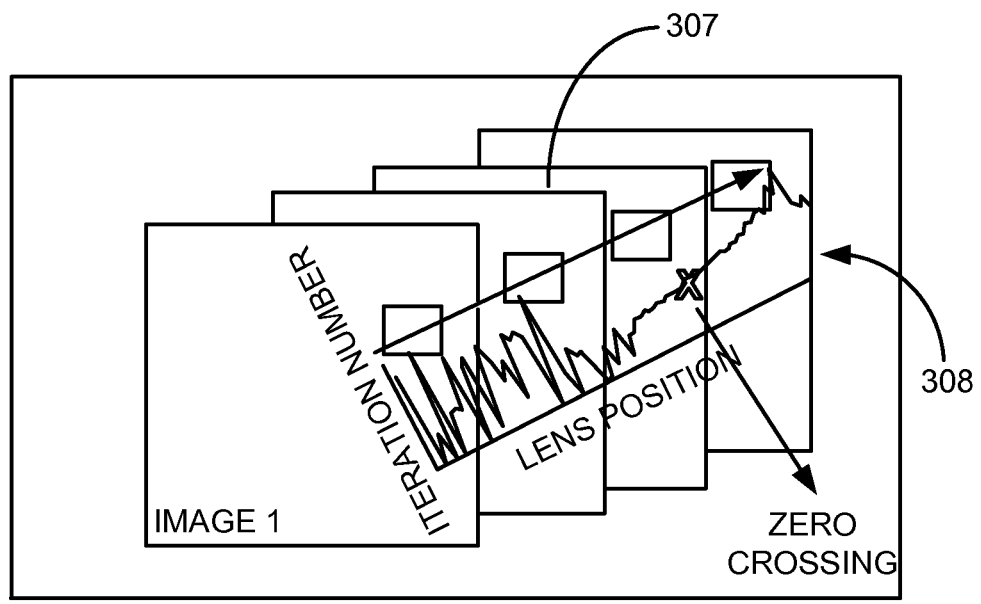
Figure 3C:
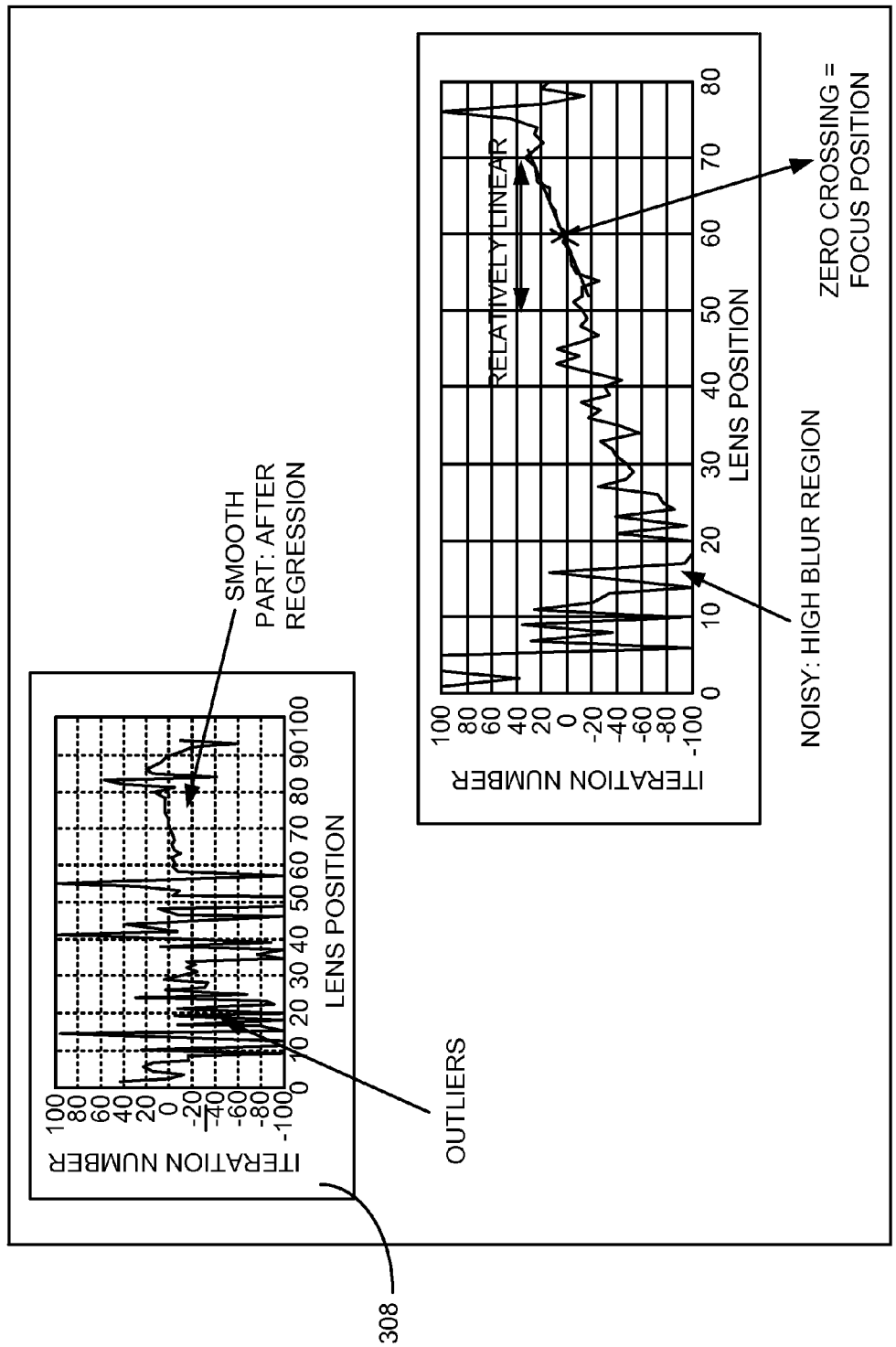

Referring now to FIGS. 3A-3C, therein are shown examples of a process flow of generating a depth map using iteration numbers in a sequence. The process of generating the depth map and calculating the focus position 214 of FIG. 2B is similar to the process shown in FIGS. 2A-2D. However, instead of using only the image pair 203 of FIG. 2A, the example process flow shows a method for using a large sequence of images.

FIG. 3A shows a block diagram of the process flow for using iteration numbers in a sequence to generate depth maps. A capture module 302 captures an image sequence 303, which is series of images or photographs. The image sequence 303 are images taken from different focal lengths and can be received from the imaging sensor 110 of FIG. 1. For example, the captured images can include the first image 206 of FIG. 2A, the second image 208 of FIG. 2A, and so forth.

The capture module 302 can also divide each of the images in the image sequence 303 into small patches. For example, the first image 206 can be divided into sixteen by sixteen pixel patches or thirty-two vs thirty-two pixel patches (patches can be N×N pixels).

An iteration module 304 calculates the iteration maps and depth maps based on iteration numbers for each pair of images within the sequence. The iteration module 304 uses the same process described in FIGS. 2A-2D above for calculating the iteration maps until all of the images in the sequence have been processed.

FIG. 3B illustrates a method for determining the zero crossing 213 point of FIG. 2B for a select patch within the image sequence 303. The zero crossing 213 point is calculated by charting iteration numbers of blur against the lens position of the camera. An iteration number curve 308 can be generated to display the results. For each of the patch 210 of FIG. 2A in the image sequence 303, the lens position can be found associated to the zero crossing 213 point of the iteration number sequence. The output can be a real number corresponding to a high resolution.

The graph shows information from iteration maps for all of the images in the sequence being plotted on a calibration curve. The lens position associated with the zero crossing 213 point of this signal will be the depth of a specific patch.

FIG. 3C shows a process of applying a linear regression for finding the zero crossing to the iteration number curve 308. The process illustrated includes operations performed by a position module 306, shown in FIG. 3A.

First, the position module 306 can extract the smoothest portion of the signal by removing outliers on the iteration number curve 308. The smooth portion of the graph displays the zero crossing and thus the focus position 214 can be derived. The high blur regions indicate noisy areas. A relatively linear curve on the graph indicates the zero crossing which identifies the focus position 214 or lens position. A depth map based on the iteration number sequence from the image sequence 303 can be generated using the methods shown in FIGS. 3A-3C.

Figure 4:
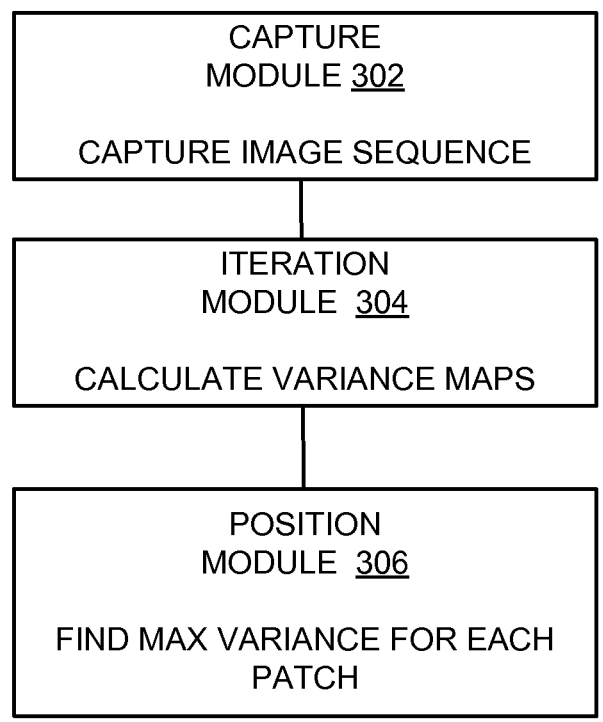
FIG. 4 is a process example of generating a variance depth map using maximum variance for each of the patches over the sequence.
Figure 4:
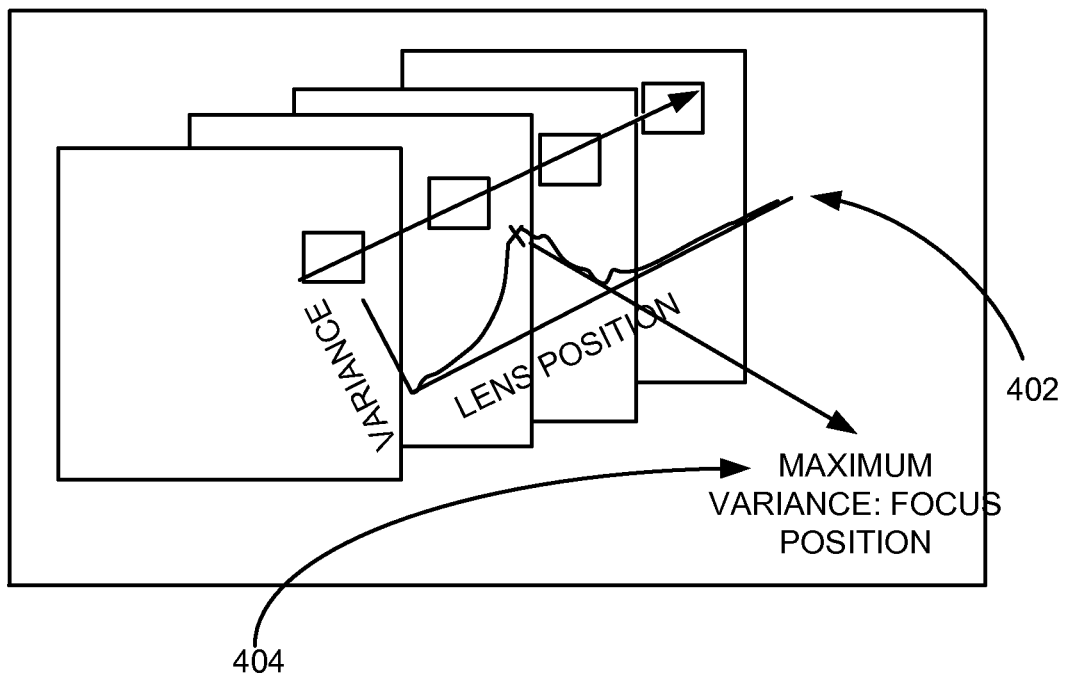

Referring now to FIG. 4, therein is shown a process example of generating a variance depth map 402 using maximum variance for each of the patches over the sequence. The process is similar to the process shown in FIG. 3A. The same modules that performed the process steps of FIG. 3A can be used to generate the variance depth map 402. For example, the method used the capture module 302, the iteration module 304, and the position module 306 shown in FIG. 3A.

Variance is a measure of how far the iteration numbers spread out from the actual DOF. The variance depth map 402 can display the lens position associated with a maximum variance 404 for each patch over the entire sequence of images.

Maximum variance calculations can be performed independently from the methods using iteration numbers shown in FIGS. 3A-3C. First, an image, such as the first image 206 of FIG. 2A is divided into N×N pixel patches (e.g. a 16×16 pixel sized patch). Then, variance of intensities inside each of the patches are calculated, which represent the sharpness of the block or patch. Then, for each patch over the entire sequence, a signal of variance value is plotted for generating the variance depth map 402.

The position associated to a maximum variance 404 would introduce or indicate the focus position 214 of FIG. 2B using this method. It has been discovered that the variance depth map 402 indicating the maximum variance 404 can be used to find the focus position 214 without the need for detecting iteration numbers for each of the patch 210 of FIG. 2A. The output can only be an integer number. However, the resolution or accuracy of the lens position is less than the resolution using the iteration number base method described in FIGS. 3A-3C.

Figure 5:
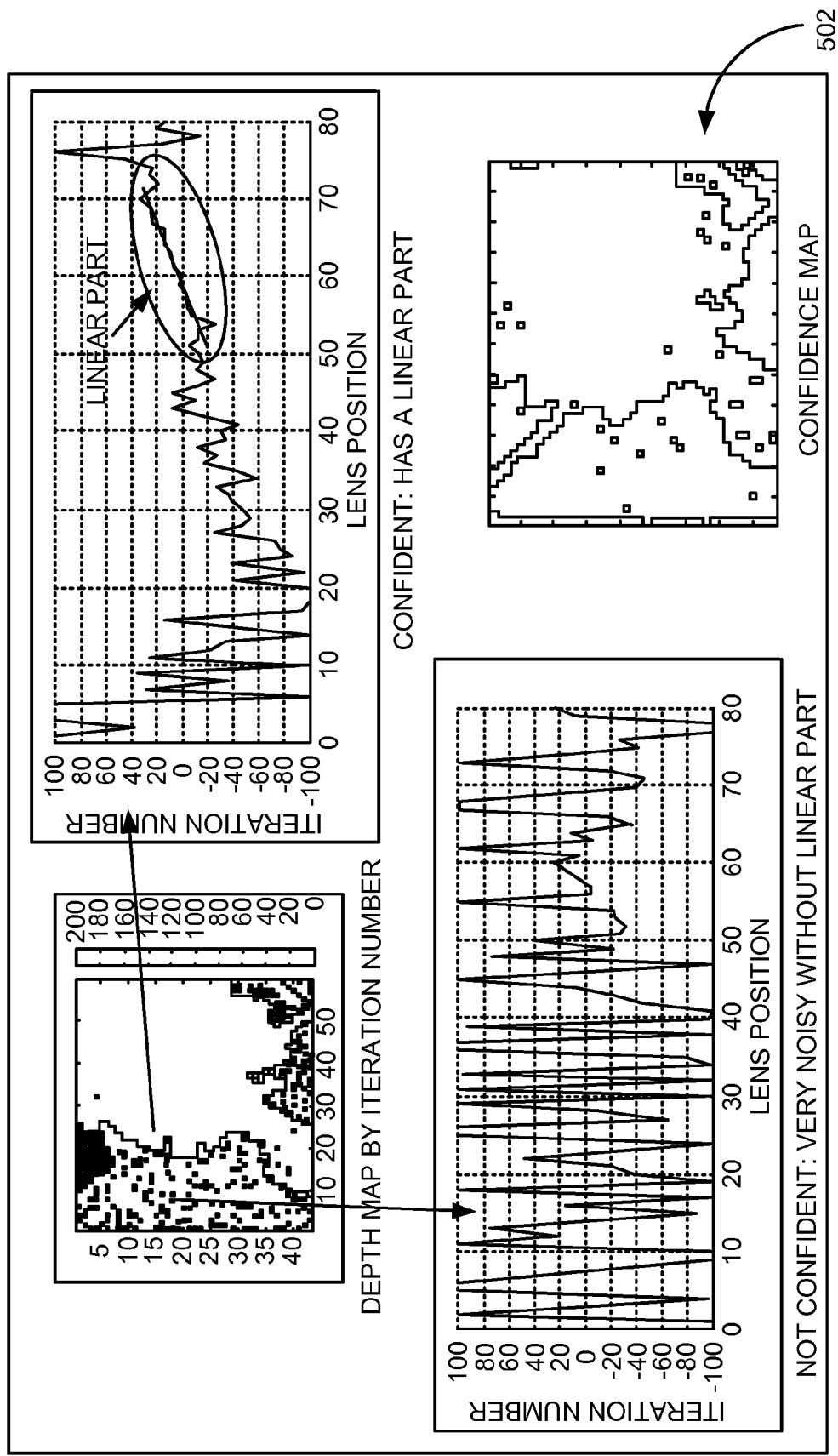
FIG. 5 is an example of the process for generating a confidence map from the iteration map of FIG. 2A.

Referring now to FIG. 5, therein is shown an example of the process for generating a confidence map 502 for depth maps based on the iteration map 212 of FIG. 2A. The confidence map 502 can be used to determine the accuracy of the information obtained through depth maps based on iteration numbers.

Due to the low amount of details in flat regions, the calculated depths can be very noisy and unreliable for such areas. The confidence map 502 can be generated to provide confidence ratings for the estimated depth for each block or patch. For example, the confidence map 502 is based on the signals from the iteration map 212 and depth maps based on iteration numbers.

In interpreting the confidence map 502, if the signal is noisy and a linear section cannot be identified, then the specific patch can be identified as "not confident", as shown on the bottom left graph of FIG. 5. Otherwise, if a linear section can be identified, the patch 210 can be labeled "confident", as shown on the top right graph of FIG. 5.

If there is a large number (over a pre-set threshold) of "not confident" patches, then more reliable methods of obtaining the lens position or depth of field of the block can be used. For example, if the depth map based on iteration numbers is labeled "not confident" then the depth map based on the maximum variance 404 of FIG. 4 or a merged depth map of the two methods can be used for a more reliable indicator. The number or amount of "not confident" blocks or patches are used to find the combination of depth maps based on maximum variance and depth maps based on iteration numbers used to find the final lens position of the kernel.

Figure 6:
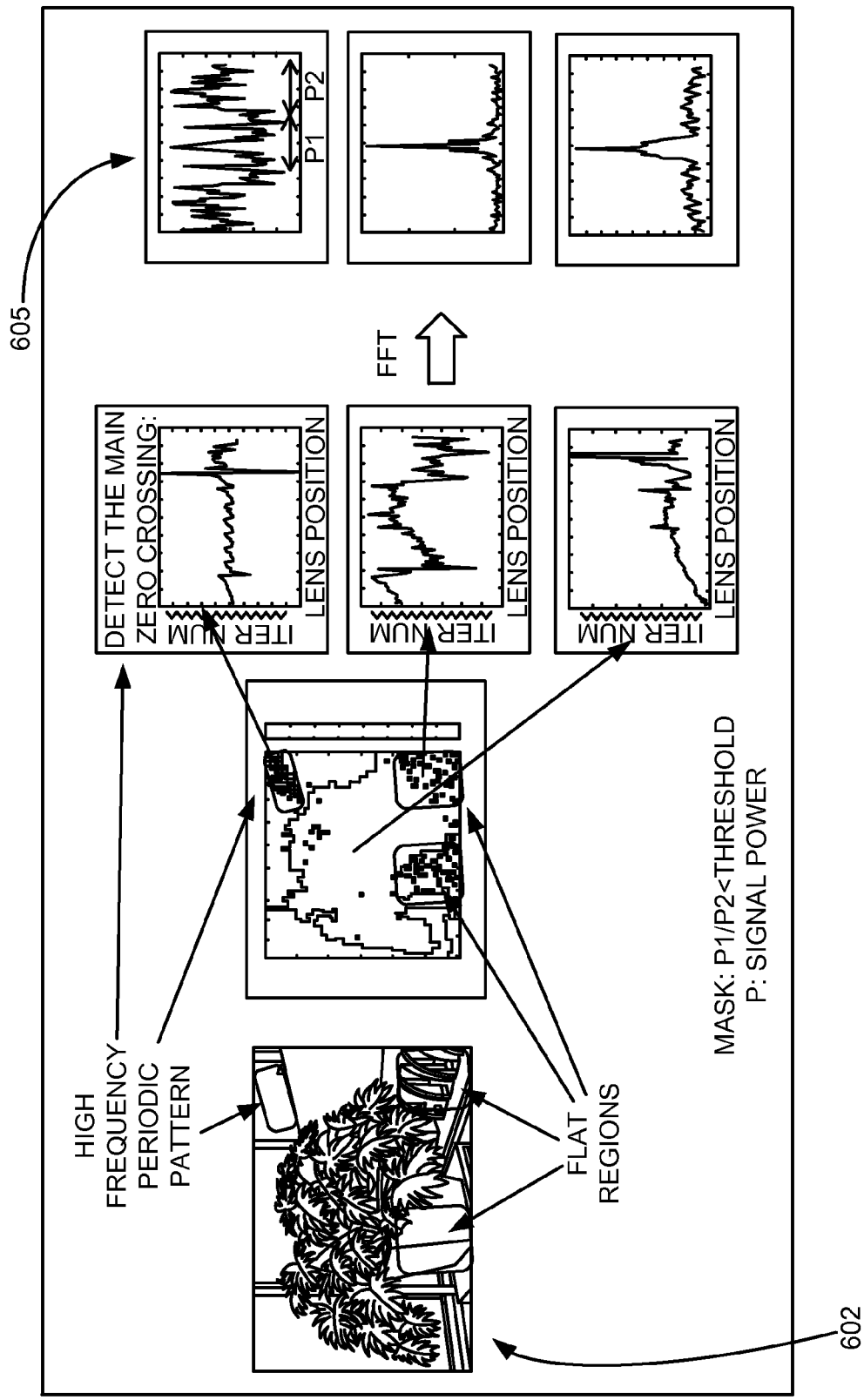
FIG. 6 is an example of the process for generating a mask for high frequency periodic patterns.

Referring now to FIG. 6, therein is shown an example of the process for generating a mask for high frequency periodic patterns. The mask is required because the iteration map process can include additional limitations. For example, depth maps based on iteration numbers fail to estimate the correct depth value in two types of regions:

First, in very flat areas, iteration number signals can be very noisy. For example, a photo 602 can include a picture of a potted plant in an office. In the photo 602, the sidewalls of a pot can represent a flat region with little depth changes.

Second, regions with high frequency periodic patterns create difficulties in interpreting the map information. In the photo 602, the high frequency periodic pattern is represented by a section of a white wall behind the plant. For these regions, the iteration number signal shows a periodic behavior which ends up having several zero crossings so the focus position 214 of FIG. 2B cannot be easily determined.

The distribution of the power in Fast Fourier transform (FFT) of the regions with high frequency periodic patterns looks different than from the regular depth areas. For example, the power of the FFT of the periodic signal is not concentrated around zero but spread in all frequencies.

For noise removal, the power spectrum is divided into three equal parts along the horizontal axis (frequency axis) as shown in a first graph 605. In the first graph 605, P1 and P2 represent the power at the central section and right section, where the ratio of P1/P2 is around 1. After dividing the power spectrum, the signal power is calculated for the second and third regions (P1 and P2).

However, in the regular regions of the image, the FFT does not hold. For these areas the majority of power is at the center of the spectrum and thus the ratio of P1/P2 is much higher than 1. It is shown that a peak at the center of the spectrum and very small amplitudes at the rest of the points. Information obtain from this method is used to provide a mask for high frequency periodic patterns.

Figure 7A:
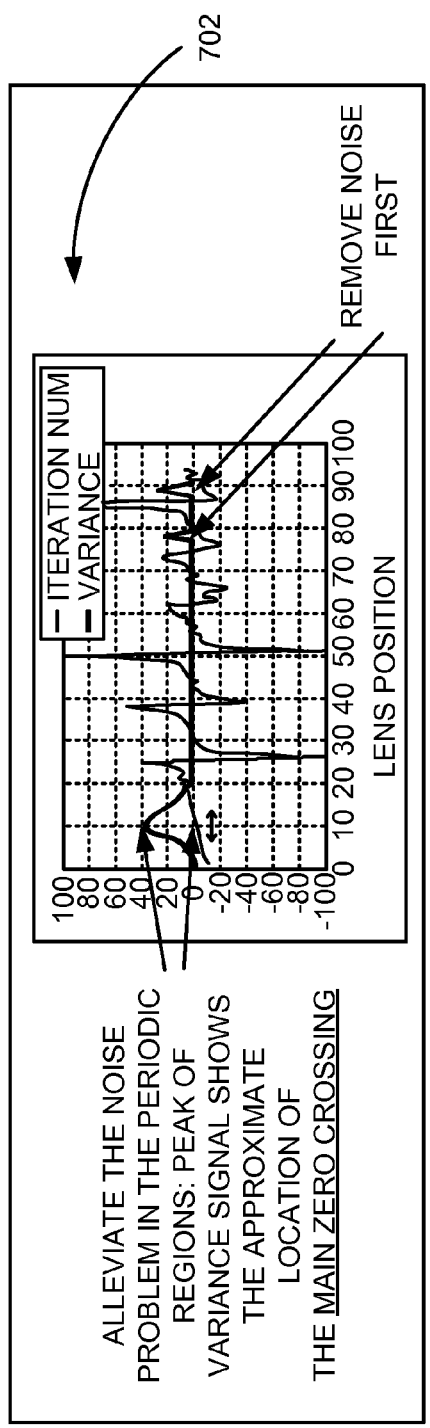
FIGS. 7A and 7B are examples of the process for generating a merged map from the iteration map of FIG. 2A and the variance depth map of FIG. 4.
Figure 7B:
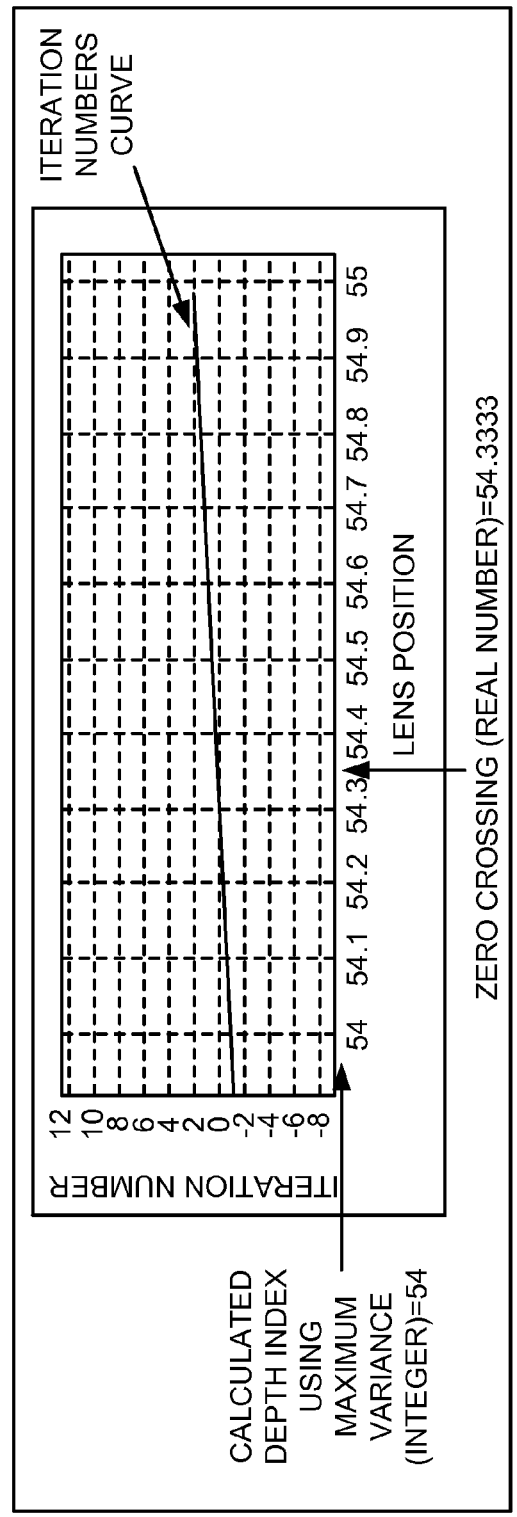

Referring now to FIGS. 7A and 7B, therein are shown examples of the process for generating a merged map 702 from the depth maps based on iteration numbers and the variance depth map 402 of FIG. 4. In the merged map 702, the iteration number curve 308 of FIG. 3B and the curve from the variance depth map 402 are combined into the same graph.

In the merged map 702, noise can first be removed. To alleviate the noise problem in the periodic regions, the peak of the variance signal shows the approximate location of the main zero crossing. The iteration number curve 308 in the same region can be used to find the lens position of the zero crossing 213 point of FIG. 2B and thus the focus position 214 of FIG. 2B.

FIG. 7B shows a process to generate the merged map 702 by increasing the resolution. The output signal from the variance depth map 402 is an integer (low resolution), while iteration number based techniques generate real numbers (higher resolution). To increase the resolution of a final merged map, the real zero crossing is extracted by using the depth index from the variance map plus the curve of iteration numbers from the depth map based on iteration numbers. The real number shown on the graph is an accurate position for the focus position 214 of FIG. 2B.

Figure 8:
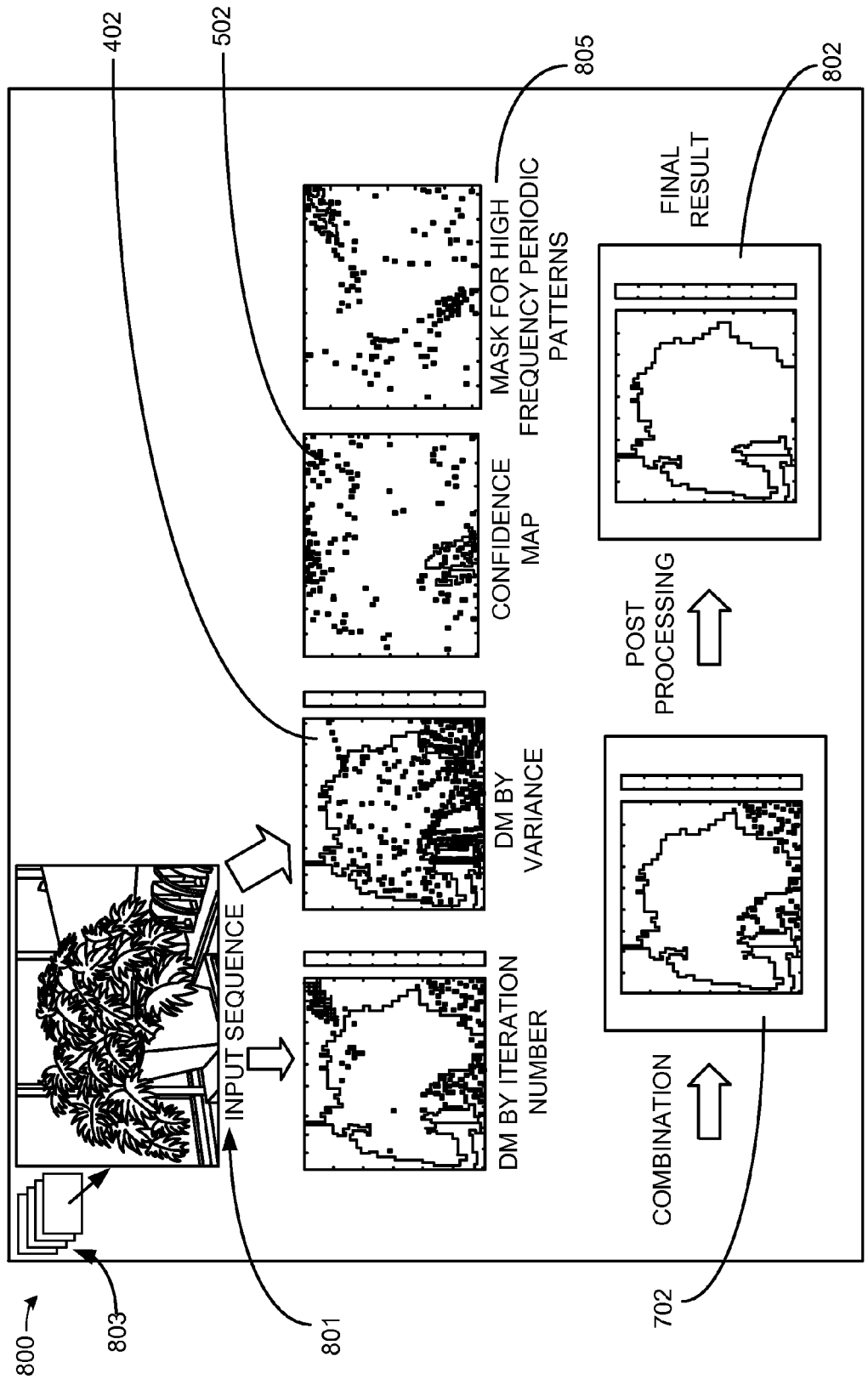
FIG. 8 is a summary diagram of the process flow of the imaging system with depth estimation in a first embodiment of the present invention.

Referring now to FIG. 8, therein is shown a summary diagram of the process flow of the imaging system 100 with depth estimation in a first embodiment of the present invention. The imaging system 100 can generate and combine a series of different maps for highly accurate depth estimation that solves the problems of simple depth estimation.

The example process flow provides an overall summary of the image processing methods of the imaging system 100. First, an input sequence 801 captures a sequence of images at different blurs levels or DOF. The imaging sensor 110 of FIG. 1 can be used to capture a sequence of images for the input sequence 801.

The input sequence 801 can receive a number or plurality of defocused images 803 along with focused images within the sequence. For example, the camera is controlled by computer using software which changes the lens position, automatically in a user specified range. The starting and ending focusing position and the Depth of Field (DOF) can be automatically or manually specified and capture images along the DOF range.

A depth map based on iteration numbers can be generated using the images obtained from the input sequence 801. For example, iteration maps are generated for of the patches for pairs of images and depth maps based on iteration numbers can be generated with the process described in 2A-3C.

The variance depth map 402 can also be generated based on the images from the input sequence 801. The variance depth map 402 shows a depth map generated with information involving the maximum variance of each patch of each image. After generation of depth maps based on iteration number and the variance depth map 402, the confidence map 502 is generated. The confidence map 502 provides feedback for the estimated depth for each block or the patch 210 of FIG. 2A with the imaging sequence.

After the generation of the confidence map 502, a mask 805 for high frequency periodic patterns is generated. The mask 805 is required because the iteration map process can include limitations in accuracy. After creation of the mask 805, the depth map based on iteration numbers and the variance depth map 402 can be combined to form the merged map 702.

The actual focus position for each region can be a point between the specified lens positions in the sequence. Thus, to increase the resolution, post processing is performed on the merged map 702 to find the real focusing positions. After post-processing a final depth map 802 can be generated from the merged map 702.

The process flow shown in FIG. 8 provides advantages over depth map estimating using only an image pair. Depth maps solo based on single or two images can be highly inaccurate. Furthermore, to have a high depth resolution, the real focusing positions must be found instead of picking from a set of discrete numbers.

It has been found that by using a sequence of images instead of an image pair increases the accuracy of estimating the focus position 214 of FIG. 2B of the patch 210. It has been discovered that by combining the depth map based on iteration numbers and the variance depth map 402 into the merged map 702, a greater accuracy can be achieved in the resulting depth map. After post-processing of the merged map 702, a final depth map 802 can include an error less than 0.5 DOF for each block or patch.

Figure 9:
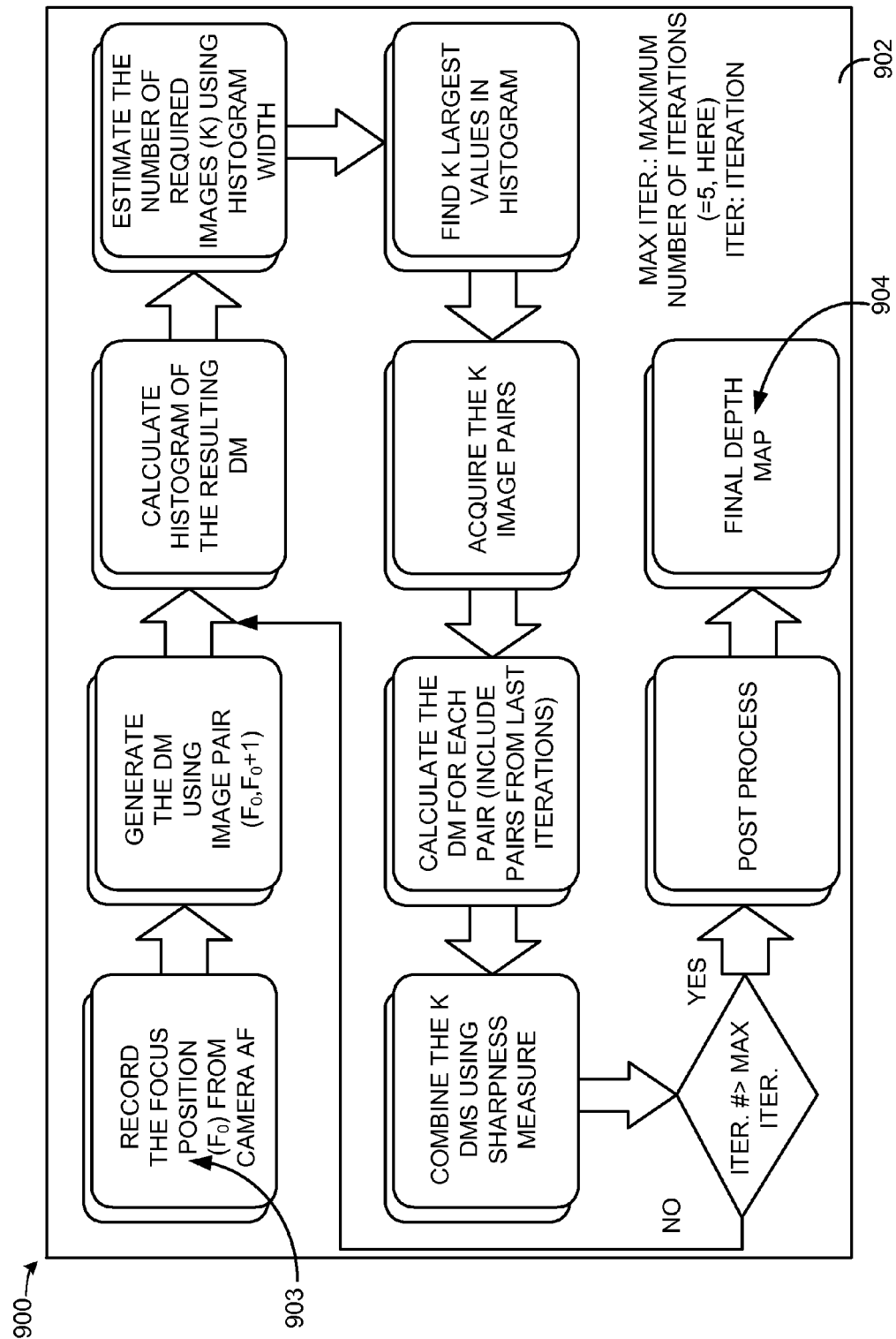
FIG. 9 is a block diagram of the process flow of the imaging system with depth estimation in a second embodiment of the present invention.

Referring now to FIG. 9, therein is shown a block diagram of the process flow of the imaging system 100 with depth estimation in a second embodiment of the present invention. The block diagram shows an alternative method of generating a final depth map 904 than the method illustrated in FIG. 8.

The imaging system 100 can include a histogram module 902 for generating a series of depth maps based on histogram information. The histogram module 902 can be operated by a control unit such as the device control unit 108 of FIG. 1. The histogram module 902 can perform each of the process steps or blocks described below for finding the focus position 214 of FIG. 2B. The histogram module 902 can also perform the same process steps and functions as described above in FIGS. 2A-8.

In a first step, for each sequence of images, the focus position 214 of FIG. 2B is recorded for an image foreground using an auto-focus function of a camera. For example, a user can accomplish this by a special mode or half pressing the camera shutter release button. Lens positions or the focus position 214 can be collected.

In a second step, a first depth map or depth map based on iteration number is generated from a pair of images at the focus position 214. For example, if the focus position 214 is 70, the iteration module 304 of FIG. 3A will use pair (70, 71).

The histogram module 902 will generate depth maps based on iteration numbers using the focus position 214 at 70 and the focus position 214 at 71. After the first two initial steps, the histogram module 902 will repeat the subsequent steps up to five iterations (N=5).

In a third step, a depth histogram is generated from the depth map that was just created. The depth histogram can include a histogram width. The histogram module 902 uses the histogram width to determine a number of the required images. The required images can include a numerical value. The required images can be represented by the letter "K".

In a fourth step, the number of dominant depths in the depth map (K depths) are calculated according to the width of the histogram above. In a fifth step, the K lens positions associated to the K greatest values in the histogram are found.

In a sixth step, the depth map for each lens position is calculated using the associated pairs. For example, if K=3 and the identified lens positions are listed as (60, 63, 67) then pairs (60, 61), (63, 64) and (67, 68) will be used to generate three additional depth maps.

In a seventh step, the union of K new lens positions and previously used positions in last iterations (totally, $K_u$ lens positions) will be generated. In an eighth step, the depth maps for the $K_u$ lens positions are calculated.

In a ninth step, for each block in the $K_u$ depth maps, the lens position or the focus position 214 is found, where the patch 210 of FIG. 2A is sharpest. Then, each of the $K_u$ depth maps are combined into a new depth map, where all blocks are selected to be sharpest in the sub-sequence. By using this method, two sharpness measures are utilized: Maximum variance if the iteration count is less than or equal to three and the iteration number if the iterations are greater than or equal to four.

After step nine, the process flow loops from step three to step nine and can end after (N=5) iterations. The final depth map 904 that is generated from step nine can be post-processed. During post processing, noise can be removed from the final depth map 904.

Further, the histogram module 902 can perform extra steps or rules depending on special circumstances. For example if the estimated number of images is large (K>10 for iteration 1 . . . 3 and K>35 for iteration 4 . . . 5), the histogram module 902 can select every other image for the sequence.

Second, in each iteration, the images extracted in previous iterations can be used as well. For example, the union of new images and previously used images are used. Third, the formula for calculating the number of images in iteration 4 and 5 is different from the first 3 iterations. This is due to the fact that more data points are needed to have a reliable regression and zero crossing estimation in the noisy iteration number curve. Otherwise, the calculated focus position will be far from the actual value.

Figure 10:
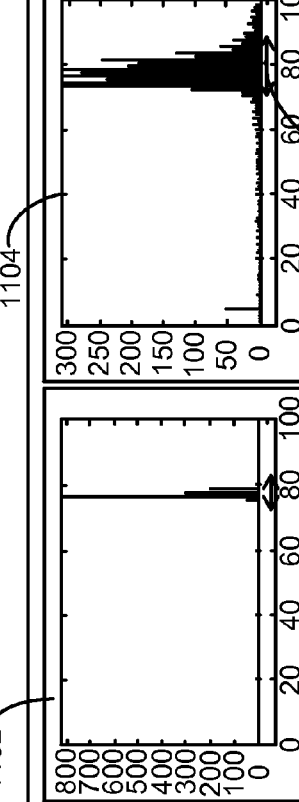
FIG. 10 is an example process for increasing the resolution to find the real number for the focus position of FIG. 9.

Referring now to FIG. 10, therein is shown an example process for increasing the resolution to find the real number for the focus position 903 of FIG. 9. The actual focus position for each region can be a point between the specified lens positions in the sequence. Thus, to increase the resolution, a method which is able to find the real focusing positions is needed. The iteration number curve is used to find the real focus position.

As shown in the example in FIG. 3B, the iteration number curve 308 of 3B can be very noisy in the large blur regions, while it is relatively linear around the focus position 214 on FIG. 2B. At the beginning of the process, the depth map is far from the real depth for most of the blocks or the patches. However, the variance curve is less noisy than the iteration number curve 308.

As a result, the iteration number measure is used once most of the blocks approach their real depth value. Thus, the maximum variance is used in the first three iterations to obtain a rough approximate of the real depth map. After the initial iterations, the iteration number is employed to increase the precision in the last 2 iterations. This method allows the histogram module 902 of FIG. 9 to find the real number for the focus position 214.

Figure 11:
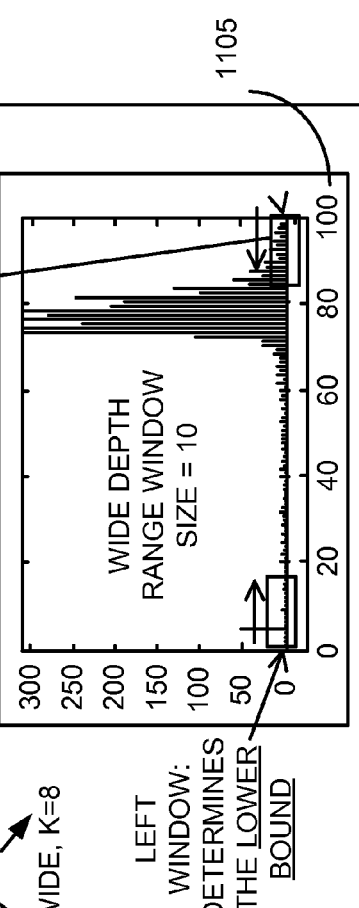
FIG. 11 is a graphical example diagram of the process steps used to adaptively estimate the required images or variable K.

Referring now to FIG. 11, therein is shown a graphical example diagram of the process steps used to adaptively estimate the required images or variable K. The detailed view shows a first histogram 1102 and a second histogram 1104 to illustrate the process. The detailed view shows how K or the required images 1106 is estimated using the histogram width 1108.

The first histogram 1102 and the second histogram 1104 are associated with a depth map of two images. For example, the first histogram 1102 and the second histogram 1104 can be associated with the simple depth map 202 of FIG. 2A. The simple depth map 202 can be obtained using the iteration map 212 of FIG. 2A and the calibration curve 205 of FIG. 2A, as described above. The measurement or width of the histogram width 1108 provides for an estimate for K or the required images 1106.

As the first histogram 1102 and the second histogram 1104 show, if the histogram width 1108 is wide, a larger amount of images are needed. If the histogram width 1108 is narrow, as seen in the first histogram 1102, then the required images 1106 is fewer. In order to estimate the width of the histogram, two sliding windows are moved on the histogram, one from left to right and the other one from right to left. Window size is set to be ten for wide depth ranges and six for very narrow depth ranges.

For example, the left window determines the lower bounds and the right window determines the upper bounds. If the median value inside the window is greater than a threshold (=7, here), then the lower/upper bound will be announced.

The number of required images 1106 or K is based on the width of the depth histogram (range). The method is illustrated by the following equations:

For iterations 1 to 3:

$$K = \frac{\text{Range}}{4}$$

For iterations 4 to 5:

$$\begin{cases} K = 15 & \text{range} < thr \quad thr = 45 \\ K = 45 & \text{otherwise} \end{cases}$$

In the last 2 iterations, regression is performed. Thus, the number of images should be large enough to allow the calculation of the zero crossing or the focus position 214 of FIG. 2B. However, for larger iterations, the number of images used can be further optimized.

For example if K=15, the selected images in the image set can include: 20, 23, 25, 26, 30, 31, 32, 35, 37, 38, 41, 42, 46, 47, and 50. To optimize the set, every other image can be selected. For example, 20, 25, 30, 32, 37, 41, 46, and 50 are selected from the set above. Regression can be run for the new K=8 set.

For flat scenes, the image contains only a few depths. Thus, in the last two iterations the selected lens positions might not have a corresponding depth in the image. For example, assuming that the scene contains five depths and K=8 in iteration 4. This indicates that at least for 3 of the listed lens positions the histogram the count is 0 and so, these images should not be included in a regression process. As a result, K ends up being equal to 5 reducing the number of images that need to be processed.

Figure 12:
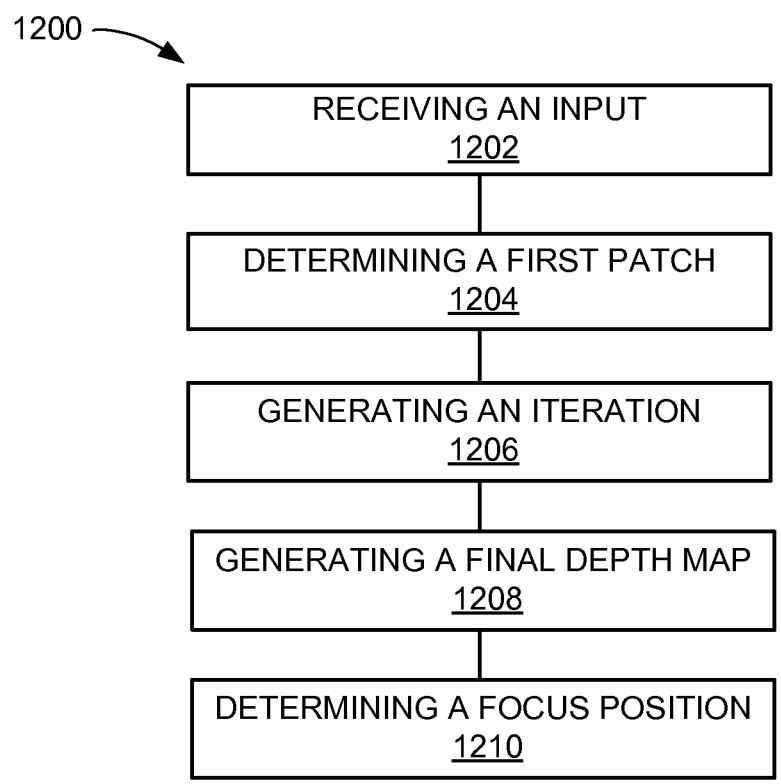
FIG. 12 is a flow chart of a method of operation of the imaging system in a further embodiment of the present invention.

Referring now to FIG. 12, therein is shown a flow chart of a method 1200 of operation of the imaging system in a further embodiment of the present invention. The method 1200 includes: receiving an input sequence with an image pair, the image pair having a first image and a second image in a block 1202; determining a first patch from the first image and a second patch from the second image in a block 1204; generating an iteration map from the first patch of the first image and the second patch of the second image in a block 1206;

generating a final depth map from the iteration map in a block 1208; and determining a focus position from the final depth map in a block 1210.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

The resulting processes and configurations are straightforward, cost-effective, uncomplicated, highly versatile and effective, can be surprisingly and unobviously implemented by adapting known technologies, and are thus readily suited for efficiently and economically manufacturing video and photography devices fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an imaging system comprising:
    receiving an input sequence with an image pair, the image pair having a first image and a second image;
    determining a first patch from the first image and a second patch from the second image;
    generating an iteration map from the first patch of the first image and the second patch of the second image;
    generating a final depth map from the iteration map, wherein generating the final depth map includes:
        generating a variance depth map including a maximum variance; and
        generating a merged map by combining the variance depth map and the iteration map; and
    determining a focus position from the final depth map.

2. The method as claimed in claim 1 wherein generating the iteration map includes:
    determining an iteration number between the first patch in the first image and the second patch in the second image; and
    detecting a zero crossing point from the iteration number.

3. The method as claimed in claim 1 wherein generating the final depth map includes extracting a plurality of lens position based on a histogram of the iteration map.

4. The method as claimed in claim 1 wherein receiving the input sequence includes receiving a plurality of defocused images.

5. A method of operation of an imaging system comprising:
    receiving an input sequence with a plurality of defocused images, the plurality of defocused images includes a first image and a second image;
    determining a first patch for the first image and a second patch for the second image;
    generating an iteration map from the first patch of the first image and from the second patch of the second image;
    generating a final depth map from the iteration map, wherein generating the final depth map includes:
        generating a histogram from the iteration map, the histogram includes a histogram width; and
        determining a number of required images from the histogram width; and determining a focus position from the final depth map.

6. The method as claimed in claim 5 further comprising generating a confidence map based on the iteration map.

7. The method as claimed in claim 5 wherein determining the focus position includes:
    generating a variance depth map from the input sequence, the variance depth map includes a maximum variance;
    combining the variance depth map with the iteration map; and
    identifying a zero crossing at the maximum variance as the focus position.

8. The method as claimed in claim 5 further comprising generating a high frequency periodic pattern mask based on the iteration map.

9. An imaging system comprising:
    a non-transitory memory configured for storing:
        a capture module for receiving an input sequence with an image pair, the image pair having a first image and a second image and for determining a first patch from the first image and a second patch from the second image, wherein the capture module is for receiving the input sequence with a plurality of defocused images including the first image, the second image, and a third image;
        an iteration module for generating an iteration map from the first patch of the first image and the second patch of the second image; and
        a position module for generating a final depth map from the iteration map and for determining a focus position from the final depth maps;
        a device control unit for generating a high frequency periodic pattern mask based on the iteration map; and
    a processor configured for processing the capture module, the iteration module and the position module.

10. The system as claimed in claim 9 wherein:
    the position module is for generating a variance depth map including a maximum variance; and
further compromising:
    a device control unit for generating a merged map by combining the variance depth map and the iteration map.

11. The system as claimed in claim 9 wherein:
    the iteration module is for determining an iteration number between the first patch in the first image and the second patch in the second image; and
further comprising:
    a device control unit for detecting a zero crossing from the iteration number.

12. The system as claimed in claim 9 wherein the position module is for extracting a plurality of a lens position based on a histogram of the iteration map.

13. The system as claimed in claim 9 wherein the capture module is for receiving a plurality of defocused images.

14. The system as claimed in claim 9 further comprising a confidence map based on the iteration map.

15. The system as claimed in claim 9 further comprising a histogram module for generating a histogram from the iteration map, the histogram includes a histogram width and for determining a number of required images from the histogram width.

16. The system as claimed in claim 9 further comprising a device control unit for generating a variance depth map from the input sequence, the variance depth map includes a maximum variance, for combining the variance depth map with the iteration map, and for identifying a zero crossing at the maximum variance as the focus position.

* * * * *